United States Patent Office 3,183,906
Patented May 18, 1965

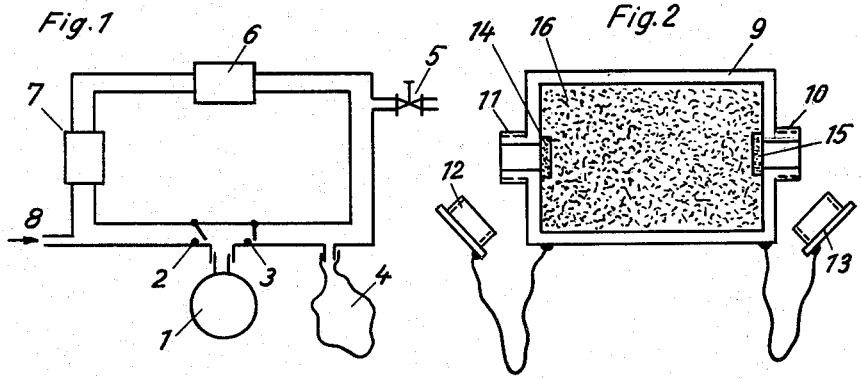
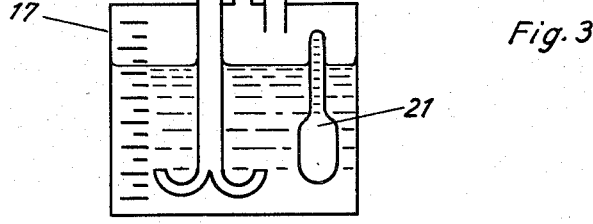
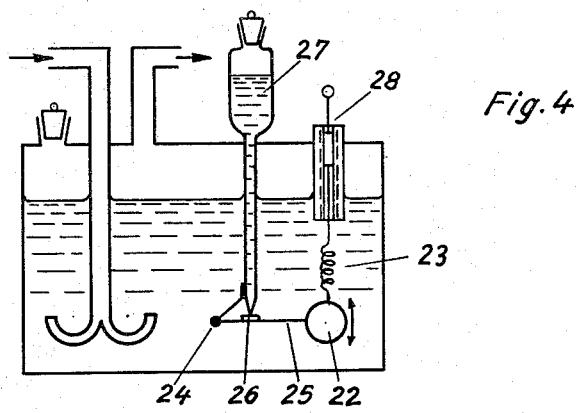

3,183,906
METHOD FOR DOSING THE CONCENTRATION OF GASEOUS OR VAPOROUS ANESTHETICS IN CLOSED SYSTEMS OF ANESTHESIA
Peter Moyat, Bergen, Kreis Hanau, Germany, assignor to Hartmann & Braun Aktiengesellschaft, Frankfurt am Main, Germany
Filed Jan. 19, 1961, Ser. No. 83,695
Claims priority, application Germany, Jan. 26, 1960, H 38,487
13 Claims. (Cl. 128—188)

For the safe control of anesthesia the measurement of the concentration of gaseous or vaporous anesthetics in inhaled anesthetizing gases is of extreme importance. Special difficulties are encountered with anesthetics having a pressure which at normal ambient temperature is much higher than that corresponding to the permissible concentration in the inhaled gas. This problem could be solved by using an open system where the anesthetic is added to the carrier gas and oxygen in the desired ratio by flow control or measurement. However, this method would be extremely costly when using modern and expensive anesthetics because large quantities would be wasted. It is therefore desirable to use a closed system where the expired and unconsumed anesthetic is cycled back and again supplied to the patient. In this connection closed and semi-closed systems are known.

The closed systems do not have any, or only little, gas discharge to the outside; the expired carbonic acid is absorbed and, depending on the consumption, the inhaled gas is supplemented with oxygen and anesthetics. For ensuring perfect control of such a system measuring instruments are required for determining the oxygen and anesthetics contents. Such instruments, especially those for determining the concentration of the anesthetic, are very expensive. Consequently, especially for hospitals with limited funds, this method is not practicable. Semi-closed systems provide for continuous discharge of part of the expirated gas to the open atmosphere. In this kind of system a continuous supply of a proportion of fresh gas to the patient is achieved by dosing, which is easier here than where there is intermittent consumption in a closed system. The quantity of the supplemented anesthetic is adjusted according to the quantity of consumed oxygen, thus obtaining, without measuring the content of anesthetic, an amount of certainty that the concentration of anesthetic is not too high. However, even with this method, a considerable part of the exhaled gas and with it unconsumed anesthetic is discharged to the atmosphere without being used and consequently this procedure is too expensive. Moreover, the concentration of the anesthetic in the cycle is not clearly defined because the consumption by the patient is not known exactly. Consequently, this system is not to be considered absolutely safe against dangerous concentrations of the anesthetic in the gas inhaled by the patient.

The objections to the above methods for measuring the concentration of anesthetics in closed systems of anesthesia are avoided by the method and apparatus of the present invention wherein the essentially pure anesthetic is introduced into the carrier gas from a mixture of an absorbing agent, such as an adsorber or a liquid solvent, for the anesthetic or in a manner to be in substantial equilibrium with the mixture.

In any case, the vapor pressure of the anesthetic over the mixture can be made sufficiently low so that the partial pressure of the anesthetic in the gas phase will not rise to any unsafe limit.

Adsorption is preferably achieved on solid substances with an active surface, e.g., activated carbon. Fluid solvents, e.g. oil with negligible vapor pressure compared with that of the anesthetic, have proved to be most suitable. There will not be any error of measurement due to the vapor of the solvent.

Proper proportioning of the concentration in the gas phase is achieved quite easily by adjusting the vapor pressure of the anesthetic by temperature control of the adsorber or liquid and by choosing proper amounts of anesthetic and absorbing agent to make the mixture. Direct control of the concentration of the anesthetic is then not required in a closed system since the critical upper limit of anesthetic concentration will never be exceeded.

Determination of the feed or supply rate of anesthetic relative to the value required for anesthesia can be achieved by one of the usual methods, e.g. as a function of the oxygen consumption. For determining the feed rate of the anesthetic it is of considerable help if the total amount of anesthetic and absorbing agent be large, irrespective of vapor pressure, so that a disturbing drop of the vapor pressure will not be caused by consumption of the anesthetic.

However, it is also possible, by suitable selection of the vapor pressure of the anesthetic, to deal with the anesthetic content of the gas direct for the value required for anesthesia. If the constitution of the patient is known, and if furthermore empirical values are available for the consumption of anesthetic, it is still possible, even with a noticeable drop in concentration of the anesthetic in the adsorber or solvent, to adjust very accurately the anesthetic content of the gas for the duration of anesthesia according to the consumption. This is because at the beginning of anesthesia the concentration of the anesthetic in the solvent or adsorber may be adjusted to a higher value relative to the later conditions of the mixture of absorber and anesthetic. At the beginning the patient consumes a considerably larger quantity of anesthetic, and due to this increased consumption the increased concentration is reduced to the value finally required for anesthesia. The consumption for continuation of anesthesia is very low so that with an average supply of anesthetic the later concentrations do not change noticeably, thus ensuring a constant anesthesia during long periods of time. Thus, especially if the amount of the mixture is small, the patient will receive large amounts of anesthetic initially, and then smaller amounts as the mixture becomes depleted.

The invention is illustrated in several embodiments shown in the drawing wherein:

FIG. 1 is a schematic representation of the cyclic system for operation as closed or semi-closed.

FIG. 2 is a detail showing of one form of an absorber means;

FIG. 3 shows another form of absorber means, and

FIG. 4 shows yet another form of absorber means.

FIG. 1 shows a closed system of anesthesia according to the method under consideration. The patient, schematically shown as the circle 1, is connected to the cycle in the usual manner, e.g. through a mask. Two non-return valves 2 and 3 enable inhaling from the left part of the cycle when inspirating the anesthetizing gas and expiration to the right part which results in a circulation of gas. The closed system includes a breathing bag 4 for compensating the respiratory movement and may be fitted with a known automatic breathing unit. A valved opening at 5 leads to the ambient air which in open condition gives a semi-closed system and, in closed condition, a closed system. Actually a so-called closed system is hardly ever gas-tight and the valved opening 5 is usually slightly open when the system is considered closed. 6 represents a carbon dioxide remover. An easily exchangeable vessel 7 which can be closed off contains the absorbing agent such as an adsorber or solvent for the anesthetic. This vessel may be arranged in the main line or in a bypass (not shown). When this vessel is in a bypass it is possible to vary the concentration of the gas of anesthesia independent from the concentration in the vessel. However, the concentration of the gas cannot exceed that in the vessel, and with this concentration being below the critical value, the patient will never be exposed to danger. An inlet member 8 is provided for connection to a supply of fresh gas, e.g. for supplementing the consumed oxygen or any desired carrier gas. FIG. 1 shows a usual breathing system for anesthesia with the exception of the arrangement and construction of vessel 7.

FIG. 2 shows a modification of vessel 7. It comprises a simple cylindrical container 9 with two connection threaded nipples 10, 11 at opposite ends. They can either be closed airtight with cover caps 12, 13 or connected to the system of anesthesia by usual screwing after removing the caps. The bores of the nipples 10 and 11 are covered by two filter plates 14 and 15 and the internal space of the vessel is filled with fine-granular adsorber substance 16, e.g. activated carbon. Charging of the vessel with anesthetic is preferably achieved by passing a gas mixture containing the desired concentration of the anesthetic through the activated carbon until saturation of the adsorber for this concentration in the gas phase. This can be achieved by known devices where an adjustable concentration is prepared and perhaps measured for the purpose of control. The anesthetic not adsorbed during charging is recollected and used again. Another way to charge the vessel is to connect it to the outlet of a device such as shown in FIGURES 3 and 4 (described below) for the partial pressure of the anesthetic in the vapor phase will eventually become substantially the same in vessel 9 and those of FIGURES 3 and 4. A recycling of the carrier gas prevents loss of the anesthetic.

The size of the vessel can be chosen in such a manner that the amount of anesthetic will be sufficient either for one or even several processes of anesthesia. If dosing of the anesthetic is to be adjusted to the most favorable value for the operation it is preferable to charge for one operation only, since otherwise the vessels would have to be much larger for avoiding changes of concentration due to consumption. Such a vessel shown in FIG. 2 and filled with a suitable concentration of the anesthetic is connected to the system of anesthesia and only the supply of oxygen is controlled. However, it must be considered that the concentration of the anesthetic in the anesthetizing gas depends on the temperature of the vessel containing the adsorber. Therefore, in cases where the ambient temperature of the operating room is not kept constant it is preferable to use a thermostat for the vessel containing the adsorber. It is possible to set the concentration of the anesthetic in the gas by adjusting the thermostat. Any anesthetic not consumed by the patient, in a closed system, returns to the adsorber.

FIG. 3 shows a modified vessel 17 containing a solvent, such as non-volatile oil, and which is especially suitable for controlling the anesthetic. In principle, this is a usual bubbling bottle with gas introduction at 18 and gas discharge at 19, fitted with a filling conduit 20 for the solvent and the anesthetic, said bottle being calibrated for varying to a predetermined relationship the proportion of solvent and anesthetic during the filling. An areometer or hydrometer 21 for determining the concentration of the anesthetic in the solution floats therein. The equipment is therefore especially suitable for obtaining any concentration of the anesthetic in the gas, since at a given temperature and given concentration of the anesthetic in the solvent, i.e. at given specific gravity of the solution, a definite concentration of the anesthetic in the gas is immediately obtained from the vapor pressure of the solution. Consequently when supplementing fluid or dissolved anesthetics or pure solvents during the anesthesia it is possible to adjust the content of anesthetics in the gas and to adapt it to the prevailing conditions, e.g. in case of high consumpion by the patient.

It is even possible to control automatically the content of anesthetics in the solvent by the equipment for measuring the specific weight of the solvent. Such an arrangement is shown in FIG. 4 wherein the vessel for the dissolved anesthetics resembles that of FIG. 3. A submerged float 22 serves as a measuring device for the specific gravity, suspended on a spring 23 so that its lift changes as a function of the specific gravity of the fluid, and consequently of the content of anesthetics. The displacement of the float resulting therefrom is transmitted to a lever 25 pivoted at 24, this lever controlling the supply of anesthetics from a supply vessel 27 via valve 26. The desired value is obtained by shifting the upper end of spring 23 upward and downward by means of adjusting device 28.

Measurement of the consumption is also possible by use of absorbing agents for the anesthetic by measuring the weight of the agent and absorbed anesthetic, since the agent substance proper will not be consumed and because, generally, anesthetics are considerably heavy. Consequently, it is only necessary to provide a suitable balance for the vessels shown in FIGS. 2, 3, and 4. It would only be necessary to consider the influence of the feed line on the weighing, this problem could be solved by using very flexible leads.

The invention lends itself to meet unforeseen situations. For example, if the FIG. 2 form of the invention is normally used as a replaceable cartridge suitable for a substantially given duration of use at constant temperature, in an emergency the temperature could be raised to drive out additional anesthetic.

The term absorber or absorbing agent as applied to anesthetics used herein will be readily understood to mean an agent substantially chemically non-reactive with the anesthetic since an outstanding object of the invention is to conserve the anesthetic for the most effective use, substantially none of the latter is to be permanently fixed or destroyed by the absorber. To the contrary, as pointed out, the use of solvent liquids or adsorptive solids as physical, rather than chemical, absorbers avoids an undesirable drop in anesthetic vapor pressure during consumption of the anesthetic. In other words, absorption by the agent is readily reversible to desorption of the anesthetic by a comparatively small decrease in partial pressure of the anesthetic in the gas phase.

The invention claimed is:

1. A method for the administration of an inhalable anesthetic having such a high vapor pressure at normal ambient temperature as to tend to produce dangerously high concentrations in gas to be inhaled from a closed system, said method comprising administering said anesthetic in contact with a reversible physical absorbing agent for the anesthetic to reduce the partial pressure of the anesthetic in the gas in the system to a safe value, the anesthetic and absorber being in such relative amounts that the latter will readily release absorbed anesthetic into the vapor phase when the partial pressure of the anesthetic is lowered and releases a concentration at least sufficient to maintain anesthesia and removing carbon dioxide from exhaled gas.

2. A method for administering inhalable anesthetic gas or vapor comprising passing gas containing a safe concentration of anesthetic through a reversible absorbing agent for the anesthetic until the agent is substantially saturated with respect to said concentration, then connecting the saturated agent into an at least partially closed anesthesia system, and supplying oxygen to and removing carbon dioxide from the system.

3. In a substantially closed anesthesia system, a container containing an absorbing agent and a gas-forming anesthetic absorbed therein, the vapor pressure of the anesthetic in the container being sufficiently low to insure a safe concentration of anesthetic in the system, and a device for removing carbon dioxide from the system, said container being provided with nipple connections for connection into the system, and cover caps for the nipple connections so that the container may be kept in charged condition disconnected from the system.

4. In a substantially closed anesthesia system, a container containing an absorbing agent and a gas-forming anesthetic absorbed therein, the vapor pressure of the anesthetic in the container being sufficiently low to insure a safe concentration of anesthetic in the system, a device for removing carbon dioxide from the system, and means for determinig the amount of anesthetic absorbed in the absorbing agent, said absorbing agent being a liquid solvent for the anesthetic, and said means being a hydrometer buoyant member.

5. In a system as claimed 4, and a source of supply of anesthetic connected to the container, and means for regulating flow of anesthetic from the supply to the container according to the position of the buoyant member.

6. In a substantially closed anesthesia system, a container containing an absorbing agent and a gas-forming anesthetic absorbed therein, the vapor pressure of the anesthetic in the container being sufficiently low to insure a safe concentration of anesthetic in the system, a device for removing carbon dioxide from the system, and means for insuring a predetermined proportion of absorbing agent and anesthetic absorbed therein.

7. An apparatus for administering anesthetics which have a high vapor pressure comprising an endless conduit for circulation of gas and provided with two serially connected check valves therein for substantially unidirectional flow of the gas in the conduit and provided with an opening between the check valves and with a branch duct at said opening for leading the gas to a patient so that inhalation and exhalation produce a circulation of gas through the conduit, inlet means to the conduit for supplying oxygen to the conduit, a vent valve connected to the conduit and open to the ambient atmosphere for regulating the degree of closure of the conduit, a vessel connected serially into the conduit and containing a reversible physical absorber for active anesthetic agent, the absorber being exposed to the gas in the conduit and the absorber being of sufficient quantity to reduce the partial pressure of the active anesthetic in the conduit to a value safe for the patient, whereby breathing by the patient tends to circulate gas through the conduit and vessel and thereby active anesthetic agent will be released from the physical absorber as the anesthetic agent becomes depleted from gas in the conduit to supply more anesthetic to the conduit gas and at a partial pressure safe for the patient.

8. An apparatus as claimed in claim 7, said vessel being down-stream from the venting valve and ahead of the check valves.

9. A method for administering active anesthetic agent by an endless conduit system to a patient comprising circulating carrier gas through a physical combination of the agent and reversible absorber therefor, the combination exerting a lower vapor pressure of the agent than the pure agent and there being sufficient absorber to render maximum partial pressure of the agent in the system safe for the patient, and giving the patient access to breathe the gaseous contents of the system, said carrier gas including oxygen for the life of the patient.

10. An apparatus for administering anesthetics which have a high vapor pressure comprising an endless conduit for circulation of gas and provided with two serially connected check valves therein for substantially unidirectional flow of the gas in the conduit and provided with an opening between the check valves and with a branch duct at said opening for leading the gas to a patient so that inhalation and exhalation produce a circulation of gas through the conduit, inlet means to the conduit for supplying oxygen to the conduit, a vent valve connected to the conduit and open to the ambient atmosphere for regulating the degree of closure of the conduit, a vessel connected serially into the conduit and containing a reversible physical absorber for an active anesthetic to liberate anesthetic in the absorber therefrom at a lower vapor pressure than the vapor pressure of the active anesthetic when the absorber is absent so that the concentration of anesthetic in the gas can be held down to a safe limit for the patient, the size of the absorber being sufficient to hold the gas concentration down to said safe limit and yet permit liberation of the anesthetic from the absorber as anesthetic is consumed by the patient.

11. An apparatus as claimed in claim 10, said absorber being of adsorptive activated carbon.

12. An apparatus as claimed in claim 10, said absorber being of an oil of negligible vapor pressure as solvent for the active anesthetic.

13. An apparatus as claimed in claim 12 and means for adding the anesthetic to the oil, and means for regulating addition of the anesthetic to the oil according to specific gravity of the solution of the anesthetic in the oil.

References Cited by the Examiner

UNITED STATES PATENTS

| | | | |
|---|---|---|---|
| 1,968,655 | 7/34 | Rogers | 183—120 |
| 2,136,236 | 11/38 | Draper | 128—2.07 |
| 2,840,074 | 6/58 | Serra | 128—188 |
| 2,848,309 | 8/58 | Hay | 23—284 |
| 2,918,356 | 12/59 | Hay | 23—284 |
| 2,925,879 | 2/60 | Costa et al. | 183—4 |

ADELE M. EAGER, *Primary Examiner.*

LOUIS R. PRINCE, *Examiner.*